US008832096B1

(12) United States Patent
Jing et al.

(10) Patent No.: US 8,832,096 B1
(45) Date of Patent: Sep. 9, 2014

(54) QUERY-DEPENDENT IMAGE SIMILARITY

(75) Inventors: Yushi Jing, San Francisco, CA (US); Wei Cai, Atlanta, GA (US)

(73) Assignee: Google Inc., Mountain View, CA (US)

( * ) Notice: Subject to any disclaimer, the term of this patent is extended or adjusted under 35 U.S.C. 154(b) by 25 days.

(21) Appl. No.: 13/297,521

(22) Filed: Nov. 16, 2011

Related U.S. Application Data

(60) Provisional application No. 61/530,094, filed on Sep. 1, 2011.

(51) Int. Cl.
*G06F 17/30* (2006.01)

(52) U.S. Cl.
USPC .......... 707/727; 707/706; 707/722; 707/723; 707/724; 707/725; 707/726; 707/728; 707/731; 707/732; 707/736; 707/758; 707/781

(58) Field of Classification Search
USPC ......... 707/706, 722–728, 731, 732, 736, 758, 707/781
See application file for complete search history.

(56) References Cited

U.S. PATENT DOCUMENTS

| | | | |
|---|---|---|---|
| 2005/0165763 A1* | 7/2005 | Li et al. | 707/3 |
| 2007/0271226 A1 | 11/2007 | Zhang et al. | |
| 2009/0070323 A1* | 3/2009 | Parikh et al. | 707/5 |
| 2009/0290812 A1* | 11/2009 | Naaman et al. | 382/305 |
| 2011/0179021 A1 | 7/2011 | Wen et al. | |

OTHER PUBLICATIONS

Title: implicit association via crowd-sourced coselection Author: Ashman et al. Pertinent pp. 10 Publisher: ACM Date: Jun. 6-9, 2011.*

* cited by examiner

*Primary Examiner* — Syling Yen
(74) *Attorney, Agent, or Firm* — Fish & Richardson P.C.

(57) ABSTRACT

Methods, systems, and apparatus, including computer programs encoded on a computer storage medium, for evaluating image similarity. In one aspect, a method includes receiving, by a data processing apparatus, image search data for different search sessions, a search session being a pre-specified period, the image search data for a search session including: search query data specifying search queries that were received during the search session; responsive image data specifying images that were identified in response to the search queries; and interaction data specifying images referenced by search results with which a user interacted. Sets of learning images are identified based on the image search data. The sets of learning images include co-selected images for the search sessions. A query-dependent image profile for a particular image is determined based in part on the co-selected images that were identified in response to the particular query.

39 Claims, 5 Drawing Sheets

QUERY-DEPENDENT IMAGE SIMILARITY

CROSS-REFERENCE TO RELATED APPLICATIONS

This application claims the benefit under 35 U.S.C. §119(e) of U.S. Patent Application No. 61/530,094, entitled "QUERY-DEPENDENT IMAGE SIMILARITY," filed Sep. 1, 2011, which is incorporated herein by reference in its entirety.

BACKGROUND

This specification relates to data processing and information retrieval.

The Internet provides access to a wide variety of resources such as images, video or audio files, web pages for particular subjects, book articles, or news articles. A search system can identify resources in response to a text query that includes one or more search terms or phrases. The search system ranks the resources based on their relevance to the query and on measures of quality of the resources and provides search results that link to the identified resources. The search results are typically ordered for viewing according to the rank.

To search image resources, a search system can determine the relevance of an image to a text query based on the textual content of the resource in which the image is located and/or based on relevance feedback associated with the image. For example, an information retrieval score measuring the relevance of a text query to the content of a web page can be one of many factors used to generate an overall search result score for the image.

Some search systems search image resources by using "query images" as input. A query image is an image represented by data, such as a jpeg file, that is used by a search engine as input to a search processing operation. Related images can be found by processing other image data for images and identifying images that are similar in visual appearance to the query image.

In some situations, the user that is searching for a particular image may not have enough information about the image to formulate a text query to which the particular image will be identified as responsive. For example, if a user is unaware of the name of (or other identifying information for) a famous Paris café, it may difficult for the user to select a textual query that will cause an image of (or other information about) the famous Paris café to be included in the image search results (or other search results). Additionally, the user may not have access to a copy of an image of the famous Paris café, such that the user is also unable to utilize a "query image" to search for information about the famous Paris café. Thus, the user may experience difficulty in obtaining information that can help the user satisfy his or her informational need.

SUMMARY

In general, one innovative aspect of the subject matter described in this specification can be embodied in methods that include the actions of receiving, by a data processing apparatus, image search data for different search sessions, a search session being a pre-specified period, the image search data for a search session including: (1) search query data specifying search queries that were received during the search session; (2) responsive image data specifying images that were identified in response to the search queries; and (3) interaction data specifying images referenced by search results with which a user interacted; identifying, based on the image search data, sets of learning images that include co-selected images for the search sessions, a pair of co-selected images for a search session being two or more images having a co-selection score that exceeds a co-selection score threshold; determining, based in part on the co-selected images that were identified in response to a particular query, a query-dependent image profile for the particular query, the query-dependent image profile specifying, for one or more image feature values, an importance of the image feature value for determining a measure of image similarity for images, an image feature value being indicative of a visual characteristic of the image; and providing data specifying the query-dependent image profile. Other embodiments of this aspect include corresponding systems, apparatus, and computer programs, configured to perform the actions of the methods, encoded on computer storage devices.

These and other embodiments can each optionally include one or more of the following features. Methods can further include the actions of receiving data specifying a set of feature values for each of one or more images; for each of the images: determining a distance vector for the image and a reference image, the distance vector being determined based on a distance between one or more image feature values from each of the image and the reference image, the reference image being an image that has been identified as responsive to the particular query; and computing an image similarity score for the image and the reference image based on the visual distance and the query-dependent image profile; providing data specifying the query-dependent image similarity scores.

Methods can further include the actions of receiving data indicating that the particular query was received from a user device; selecting a set of images that are responsive to the particular query, the set of images being selected, at least in part, on the query-dependent image similarity scores; and providing data specifying the set of images.

Identifying sets of learning images that include co-selected images can include identifying, for each search session, two or more images with which a user interacted during the search session, the two or more images being referenced by a search results page for the particular search query.

Methods can further include the actions of obtaining a co-selection vector for each of the images that, according to the responsive image data, were identified in response to the particular query; determining a co-selection score for pairs of the images, the co-selection score for each pair of images indicating a distance between the co-selection vectors for the images in the pair; and selecting, based on the co-selection scores and a search rank for each of the images, a plurality of sets of learning images for the query-dependent image profile, the search rank being a value indicative of a presentation location for the image on the search results page.

Selecting a plurality of sets of learning images can include, for each set of learning images, selecting a pair of images for which the co-selection score is greater than a first distance threshold, wherein a first image in the pair has a search rank that is higher than the search rank for a second image in the pair. Selecting a plurality of sets of learning images further can include, selecting a third image for each set of learning images. The co-selection score between the first image and the third image can be below a second distance threshold. The search rank of the third image can be greater than the search rank of the second image, but lower than the first image. The first distance threshold can be greater than the second distance threshold. Determining a query-dependent image profile can include determining an image feature weight vector for which a norm of the image feature weight vector is less than a threshold value.

Another innovative aspect, methods can include the actions of receiving, by a data processing apparatus, image search data for different search sessions, a search session being a pre-specified period, the image search data for a search session including: (1) search query data specifying search queries that were received during the search session; (2) responsive image data specifying images that were identified in response to the search queries; and (3) interaction data specifying images referenced by search results with which a user interacted; determining a co-selection score for pairs of the images, the co-selection score for a pair of images indicating a distance between co-selection vectors for the images in the pair; selecting, based on the co-selection scores and a search rank for each of the images, a plurality of sets of learning images, the search rank being a value indicative of a presentation location for the image on the search results page; and providing data specifying the sets of learning images. Other embodiments of this aspect include corresponding systems, apparatus, and computer programs, configured to perform the actions of the methods, encoded on computer storage devices.

These and other embodiments can each optionally include one or more of the following features. Selecting a plurality of sets of learning images can include, for each set of learning images, selecting a pair of images for which the co-selection score meets a first distance threshold, wherein a first image in the pair has a search rank that is higher than the search rank for a second image in the pair. Selecting a plurality of sets of learning images can further include, selecting a third image for each set of learning images. The co-selection score between the first image and the third image can meet a second distance threshold. The search rank of the third image can be greater than the search rank of the second image, but lower than the first image. The first distance threshold can be greater than the second distance threshold.

Methods can further include the actions of determining, based in part on the sets of learning images that include co-selected images that were identified in response to a particular query, a query-dependent image profile for the particular query, the query-dependent image profile specifying, for one or more image feature values, an importance of the image feature value for determining a measure of image similarity for images, an image feature value being indicative of a visual characteristic of the image; and providing data specifying the query-dependent image profile. Determining a query-dependent image profile can include determining an image feature weight vector for which a norm of the image feature weight vector is less than a threshold value.

Particular embodiments of the subject matter described in this specification can be implemented so as to realize one or more of the following advantages. Query-dependent image profiles can be determined on a per-query basis, and the query-dependent image profile for each particular query can be used to identify images that are responsive to the query upon receipt of the query. Using the query-dependent image profiles to identify images that are responsive to the query (e.g., rather than performing pair-wise image feature value analysis for each pair of images) reduces the processing resources required to identify the images that are responsive to the query. Additionally, use of the query-dependent image profiles facilitates identification of a "new image" (e.g., a recently indexed image) as being responsive to the query irrespective of whether visual distances between the new image and other responsive images have been previously computed.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A query-dependent image profile is determined for a query (e.g., a text query or an image query). A query-dependent image profile is a set of values (e.g., a vector) that are indicative of a relative importance of corresponding image feature values (e.g., values indicative of visual features of an image) for selecting images that are responsive to the query. For example, the query-dependent image profile for a particular query can indicate the relative importance of shape information, contrast information, texture information, color information, and other information regarding visual features of an image for determining which images are considered visually similar in the context of the query and/or which images should be provided in response to the query.

The query dependent image profile can be determined using information about visual features of images that were previously presented to users in response to receipt of the query. For example, if a user interacts with (e.g., clicked on or otherwise selected) an image from a set of search results and then interacts with another image from the search results, this series of interactions can be considered an indication that these images are relevant to the query and/or that the user considered these images visually similar for the purposes of this query. Thus, an analysis of image feature values for two or more images with which users interacted may reveal visual similarities and visual differences between the images that were selected, which can facilitate determination of the relative importance of particular image feature values for identifying images that users consider visually similar for the query and/or selecting images that are responsive to the query.

In addition to analyzing the image feature values for the images with which users interacted, the query dependent image profile may also be determined, in part, using image feature values for images with which users did not interact (or with which less than a threshold portion of users interacted) following interaction with another image. For example, if a user interacts with two or more images from the search results, lack of user interaction with another image (e.g., an image that is presented at a presentation location that is above at least one of the two or more images) may be an indication that the user considered this other image to not be responsive to the query and/or to not be visually similar to the other images for purposes of this query.

Figure 1:
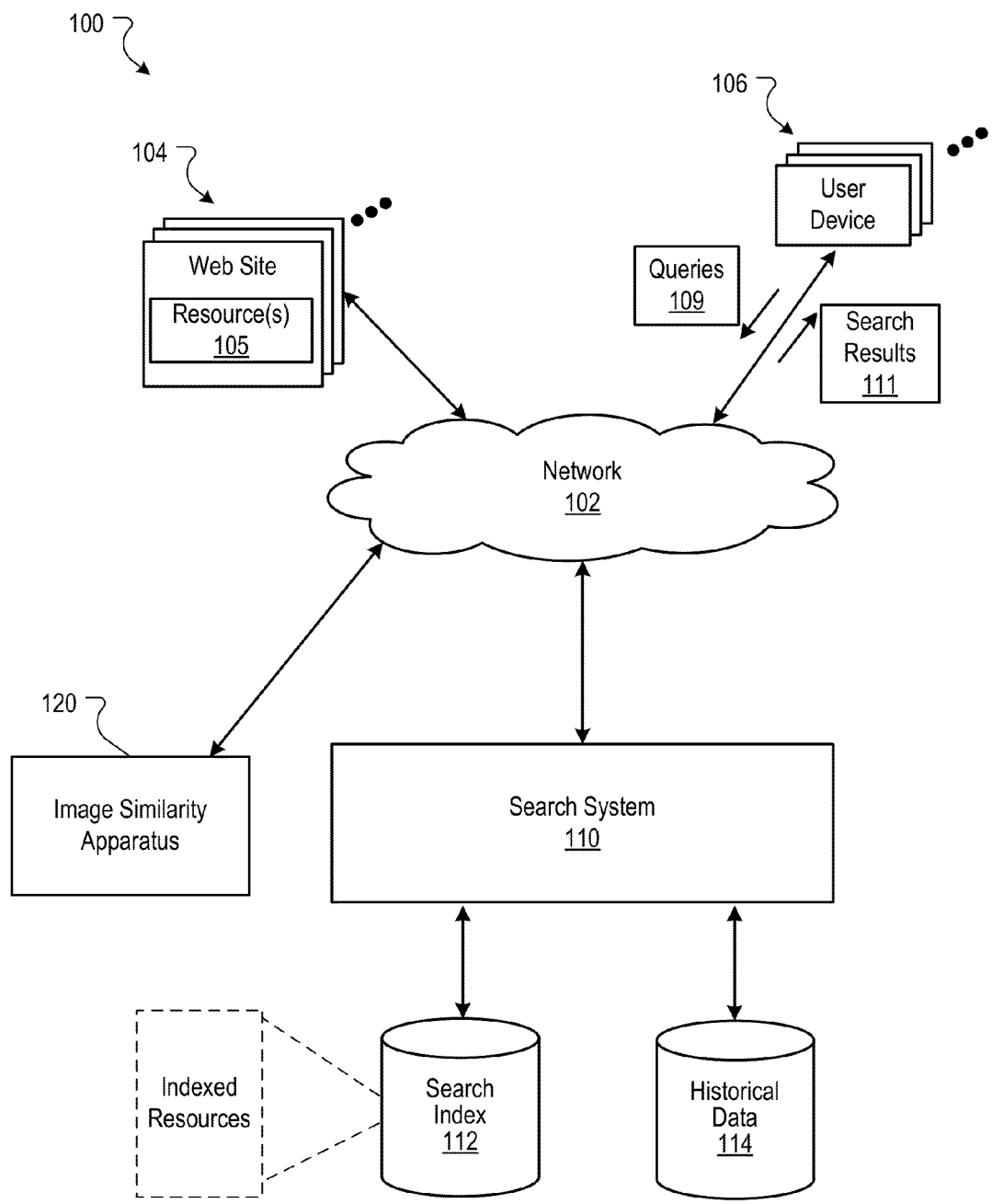
FIG. 1 is a block diagram of an example environment in which a search system provides search services.

FIG. 1 is a block diagram of an example environment 100 in which a search system 110 provides search services. The example environment 100 includes a network 102, e.g., a local area network (LAN), wide area network (WAN), the Internet, or a combination of them, connects web sites 104, user devices 106, and the search system 110. The environment 100 may include many thousands of web sites 104 and user devices 106.

A web site 104 is one or more resources 105 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is any data that can be provided by a web site 104 over the network 102 and that is associated with a resource address. Resources 105 include HTML pages, word processing documents, and portable document format (PDF) documents, images, video, and feed sources, to name just a few. The resources 105 can include content, e.g., words, phrases, images and sounds and may include embedded information (e.g., meta information and hyperlinks) and/or embedded instructions (e.g., JavaScript scripts).

A user device 106 is an electronic device that is under control of a user and is capable of requesting and receiving resources 105 over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 105, the search system 110 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 112.

The user devices 106 submit search queries 109 to the search system 110. In response, the search system 110 accesses the search index 112 to identify resources 105 that are relevant to (e.g., have at least a minimum specified relevance score for) the search query 109. The search system 110 identifies the resources 105, generates search results 111 that identify the resources 105, and returns the search results 111 to the user devices 106. A search result 111 is data generated by the search system 110 that identifies a resource 105 that is responsive to a particular search query, and includes a link to the resource 105. An example search result 111 can include a web page title, a snippet of text or a portion of an image extracted from the web page, and the URL of the web page.

For a search of textual content, the search results are ranked based, at least in part, on scores related to the resources 105 identified by the search results 111, such as information retrieval ("IR") scores, and optionally a quality score of each resource relative to other resources. In some implementations, the IR scores are computed from dot products of feature vectors corresponding to a search query 109 and a resource 105, and the ranking of the search results is based on initial relevance scores that are a combination of the IR scores and page quality scores. The search results 111 are ordered according to these initial relevance scores and provided to the user device 106 according to the order.

For image searches, the search system 110 can combine the initial relevance score of a resource with a relevance feedback score of an image embedded in the resource. An example relevance feedback score is a score derived from a selection rate (e.g., click-through-rate or another interaction rate) of an image when that image is referenced in a search result for a query. These combined scores are then used to present search results directed to the images embedded in the resources 105.

The initial relevance scores for an image can be based, in part, on labels that are associated with the image. Labels are textual content or data flags that indicate a topic to which the image belongs. Labels can be explicitly associated with (e.g., indexed according to and/or stored with a reference to) an image, for example, by the publisher that is providing the image. For example, a publisher can associate the text "Eiffel Tower" with an image depicting the Eiffel Tower. Labels can also be explicitly associated with an image by users to whom the image is presented. For example, users can engage in activities, such as online games, in which the users provide text that describes the content of an image that is presented to the user. In turn, when a threshold portion of users have specified particular text as being descriptive of the image, the image can be labeled with the particular text.

Labels can also be associated with an image based on relevance feedback for the image. In some implementations, a label that matches a query can be associated with (e.g., assigned to, indexed according to, and/or stored with a reference to) an image when the image is selected for presentation by users (e.g., who submitted the query) with at least a threshold selection rate (e.g., a threshold click-through-rate or another threshold interaction rate). In turn, the label can then be used to select the image for reference in search results responsive to future instances of the query.

For example, assume that the threshold selection rate is 10%, and that an image of the Arc de Triomphe has been referenced by search results that were provided in response to the search query "Paris landmarks." In this example, if the selection rate of the image of the Arc de Triomphe exceeds 10%, the label "Paris landmarks" can be associated with the image of the Arc de Triomphe. The label "Paris landmarks" can also be associated with an image of the Eiffel Tower if the selection rate for the image of the Eiffel Tower also exceeds 10% when presented in response to the search query "Paris landmarks."

The initial relevance score for an image relative to a particular query can also be based on how well an image label matches the particular query. For example, an image having a label that is the same as the particular query can have a higher relevance score than an image having a label that is a root of the query or otherwise matches the query based on query expansion techniques (e.g., synonym identification or clustering techniques). Similarly, images having labels that match the query are identified as more relevant to the query than images that do not have labels matching the query. In turn, the reference positions at which images having labels that match the query can be higher than the search result positions at which images that do not match the query are referenced.

In the example above, the images of the famous Paris café, the Eiffel Tower, and the Arc de Triomphe are each associated with the label "Paris landmarks," such that each of these images may be identified as responsive to the query "Paris landmarks." Thus, references to the images of the famous Paris café, the Arc de Triomphe, and the Eiffel Tower may both be referenced by search results 111 that are provided in response to the search query "Paris landmarks."

The user devices 106 receive the search results 111, e.g., in the form of one or more web pages, and render the search results for presentation to users. In response to the user interacting with (e.g., affirmatively selecting or hovering over) a link in a search result at a user device 106, the user device 106 requests the resource 105 identified by the link. For brevity, this document refers to user interactions with search results as clicks of images, but user interactions are not limited to clicks. For example, a pointer being "hovered" over an image for more than a threshold amount of time can be considered user interaction with the image. The web site 104 hosting the resource 105 receives the request for the resource from the user device 106 and provides the resource 105 to the requesting user device 106. When the search result references an image, the resource 105 that is requested may be a copy of the image and/or other content that is presented on a same web page with the image.

Images that are responsive to a search query can also be identified based on visual similarities between the images. For example, assume that a first image of the Eiffel Tower is identified (e.g., based on a label) as being responsive to the search query "Paris landmarks." Further assume that second image of the Eiffel Tower is not associated with a label that matches the search query "Paris landmarks," and therefore, is not identified as responsive to the search query based on labels. In this example, the second image of the Eiffel Tower can still be identified as responsive to the search query if the second image of the Eiffel Tower is determined to be visually similar to (e.g., have at least a threshold image similarity score relative to) the first image of the Eiffel Tower.

Image similarity between two images can be determined, for example, based on a visual distance (e.g., a cosine distance) between image feature vectors for the images. The image feature value vector for each of the images is a set of image feature values are values that indicate visual features of the image. For example, the image feature value vector for an image can include image feature values that respectively represent color information for the image, brightness information, texture information, edge location information, and other visual information for the image. Thus, the visual distance between the image feature value vectors can provide a value (i.e., an image similarity score) that is indicative of the visual similarity of the images.

Image similarity, from a user's perspective, may vary based on the informational need (e.g., as indicated by the search query) of the user. For example, users that submit the search query "Paris landmarks" may consider an image of the Eiffel tower as it appears during the day ("a day image of the Eiffel Tower") to be visually similar to an image of the Eiffel tower as it appears at night ("a night image of the Eiffel Tower"), despite the differences between the color and/or brightness of these images. However, users that submit the search query "Eiffel Tower" may consider, for purposes of the query "Eiffel Tower," the day image of the Eiffel Tower to not be visually similar to the night image of the "Eiffel Tower."

The search system 110 is in data communication with an image similarity apparatus 120 that facilitates identification of similar images on a per-query basis. As illustrated by FIG. 1, the search system 110 can communicate with the image similarity apparatus 120 over the network 102. In some implementations, the image similarity apparatus 120 can be implemented as a component of the search system 110. For example, the image similarity apparatus 120 can be implemented independent of indexers, rankers, web crawlers, or other components of the search system 110.

As described in more detail below, the image similarity apparatus 120 analyzes user interactions with one or more references to the images that are presented in the search results 111 to determine which images users considered visually similar images for that particular search query. For example, assume that the image similarity apparatus 120 determines, based on user interaction data, that at least a first threshold portion of the users (e.g., 30% of the users) that submitted the search query "Paris landmarks" clicked on an image depicting the day image Eiffel Tower and then subsequently clicked on an image depicting night image of the Eiffel Tower. In this example, because a relatively high number (e.g., more than the first threshold portion) of users that clicked the day image of the Eiffel Tower also clicked the night image of the Eiffel Tower, the image similarity apparatus 120 determines that users considered these images (e.g., the day image and the night image of the Eiffel Tower) as visually similar for the purposes of the search query "Paris Landmarks", despite the color differences between these images.

The image similarity apparatus 120 can further consider a lack of user interaction with an image (e.g., following, or prior to interaction with another image) as an indication that the image is not visually similar to other images that were clicked by the user. Continuing with the example above, the image similarity apparatus 120 may determine that less than a second threshold portion (e.g., less than 10%) of the users who clicked on either (or both) of the images of the Eiffel Tower also clicked on an image of the Arc de Triomphe. In this example, because a relatively low number (e.g., less than the second threshold portion) of the users that clicked an image of the Eiffel Tower also clicking the image of the Arc de Triomphe the image similarity apparatus 120 can determine that users did not consider the image of the Arc de Triomphe as being visually similar to the images of the Eiffel Tower for the search query "Paris Landmarks."

The image similarity apparatus 120 can use the user interaction based determinations of visual similarity along with the image feature value vectors for the images to generate a query-dependent image profile with which images can be selected for presentation in response to the query. In some implementations, the query-dependent image profile is a set of values (e.g., a vector), where each value is indicative of a relative importance of (e.g., a weight for) an image feature value for determining whether two images are visually similar in the context of a particular query.

The image similarity apparatus 120 can evaluate the query-specific similarity of a pair of images, for example, by determining a distance vector for the images (e.g., a vector that specifies a per-image-feature distance for the image feature values of the images) and computing a result of a function of the query-dependent image profile and the distance vector. The result of the function can be, for example, the result of a dot product, a cosine distance between the vectors, or the result of another mathematical function.

The result of the function is referred to as an image similarity score (or a query-specific image similarity score) for the pair of images, and the image similarity scores can be considered when determining whether particular images are provided in response to a particular query. For example, the image similarity apparatus 120 (or another data processing apparatus) can identify a particular image as visually similar to another image (e.g., based on the image similarity score for the images meeting an image similarity threshold) that has been selected as responsive to the query (e.g., based on a label associated with the image). In turn, the image similarity apparatus 120 can also select the particular image as being responsive the query (e.g., irrespective of whether the particular image has a label that matches the query). Additionally, or alternatively, the presentation position or ranking of a search result that references the particular image can be determined or adjusted based on the image similarity score.

The description that follows provides additional details regarding the determination of a query-dependent image profile. For example, the description that references FIGS. 2 and 3 discusses techniques by which a query-dependent image profile is determined. Determination of the query-dependent image similarity score is described with reference to FIG. 4.

Figure 2:
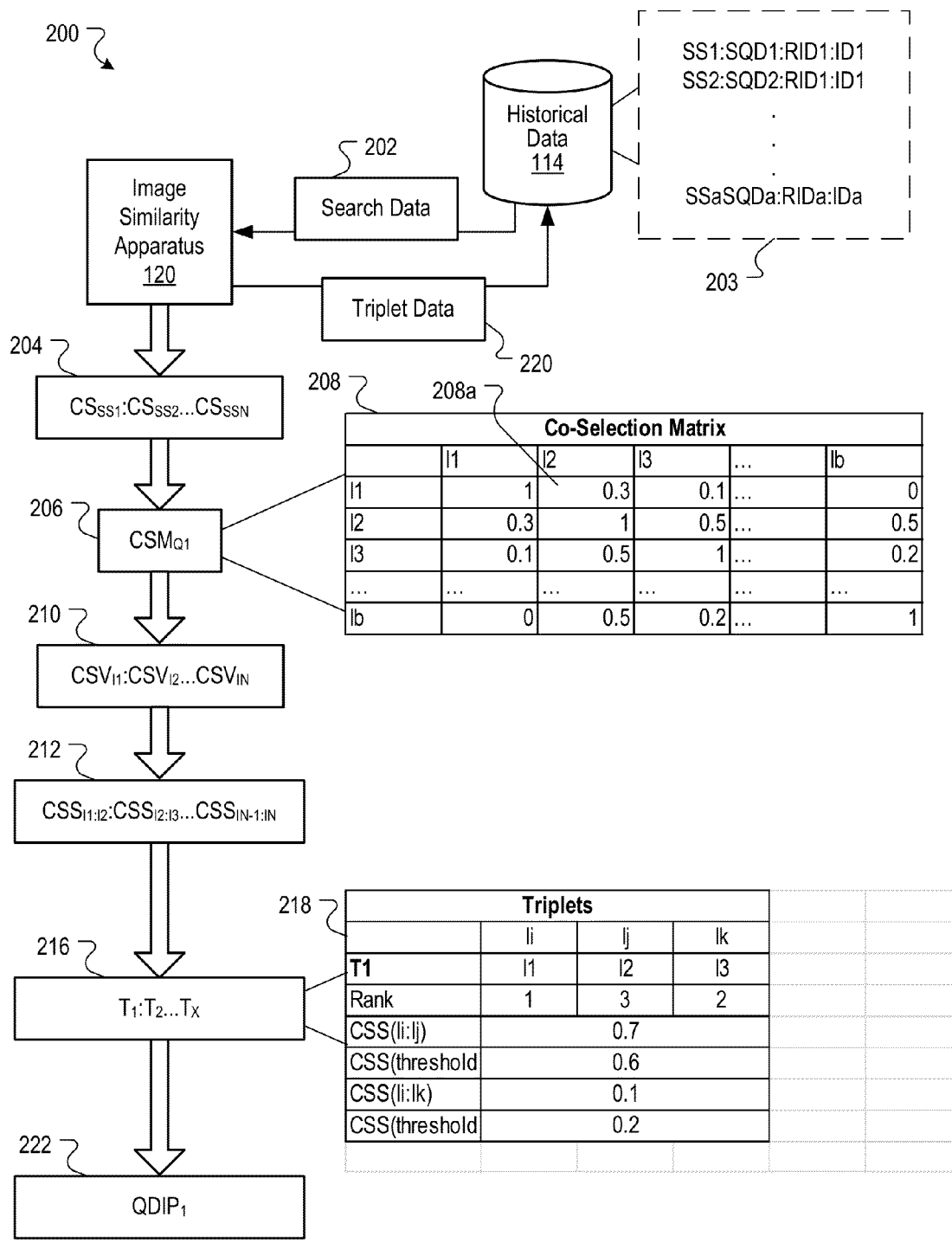
FIG. 2 is a block diagram of an example data flow for determining a query-dependent image profile.
Figure 3:
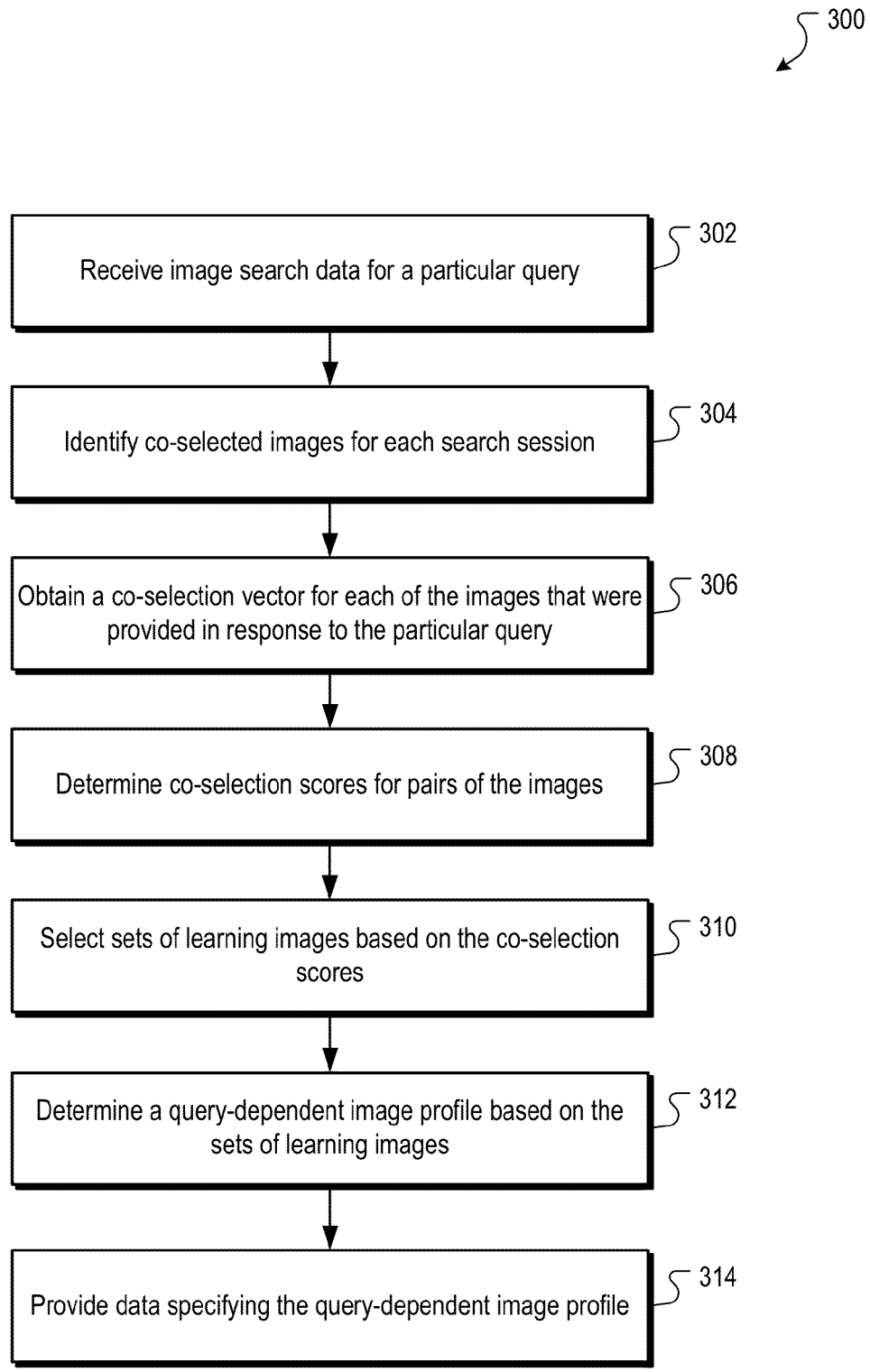
FIG. 3 is a flow chart of an example process for determining a query-dependent image profile.

FIG. 2 is a block diagram of an example data flow 200 for determining a query-dependent image profile, and FIG. 3 is a flow chart of an example process 300 for determining a query-dependent image profile.

The data flow can begin, for example, with the image similarity apparatus 120 receiving image search data 202 for a particular search query (302). In some implementations, the image search data 202 is indexed according to a search session during which the image search data was generated and/or obtained. A search session is a pre-specified period that begins with a start event (e.g., requesting a search web page or submitting a first search query through the search web page) and ends when an end event occurs. The end event can be, for example, the user navigating away from the search web page (or a search results page), the browser being closed, and/or a pre-specified period of time elapsing after occurrence of the start event.

The historical data store 114 (or another data store) can store indexed image search data 203. The indexed image search data 203 can include search session identifiers (e.g., SS1-SSa) that represent different search sessions. The search data that are indexed to each of the search session identifiers (e.g., SS1-SSa) can include search query data (e.g., SQD1-SQDa) that specify one or more search queries that were received during the search session.

Responsive image data (e.g., RID1-RIDa) that are indexed to each of the search session identifiers can specify images that were provided in response to the search queries that were received during the search session. Further, interaction data (e.g., ID1-IDa) can specify, for each of the search sessions, the images with which the user interacted (e.g., clicked) during the search session.

The data flow continues with the image similarity apparatus 120 identifying co-selected images 204 for each search session (304). In some implementations, co-selected images are two or more images with which a user interacted during a same search session and/or that were both referenced by a search results page for a particular search query.

The image similarity apparatus 120 can identify co-selected images 204 (e.g., $CS_{I1}$-$CS_{In}$) on a per-session basis and/or on a per-query basis. For example, the image similarity apparatus 120 can identify based on the search data 202 the images with which a user interacted during a particular search session (e.g., SS1). In turn, the image similarity apparatus 120 can identify each of these images as co-selected images for the search session. The image similarity apparatus 120 can also create a different set of co-selected images for each query that was received during the search session (e.g., SS1), such that each of the co-selected images in a particular set of co-selected images will have been provided in response to a same search query.

For example, assume that during search session 1 (e.g., SS1) a user interacts with images A, C, D, and E. Further assume that the images A, B, and C were presented in response to the search query "Paris landmarks" and that the images D and E were presented in response to the search query "Eiffel Tower." In this example, the images A, C, D, and E can all be identified as co-selected images during search session 1. However, when the sets of co-selected images are further delineated on a per-query basis, the images A and C will be included in one set (or subset) of co-selected images, while images D and E will be included in a different set of co-selected images.

In some implementations, the image similarity apparatus 120 can use the sets of co-selected images to update a co-selection matrix 206 (e.g., $CSM_{Q1}$) for the query. A co-selection matrix is a set of values for a particular query that indicate rates at which each image (e.g., each image that was provided in response to the particular query) is co-selected with each other image for the particular query (e.g., each other image that was provided in response to the particular query). Other data structures (e.g., an array, linked list, or hash-table) can be used to store co-selection data for the query.

An example co-selection matrix is illustrated in the table 208. Each cell of the table 208 includes a value that is indicative of the rate at which pairs of images (e.g., I1 and I2) are co-selected images for a particular query. For example, the cell 208a includes the value 0.3 indicating that the images I1 and I2 are co-selected images at a rate of 0.3. In some implementations, the rate of co-selection is expressed as a percentage of all instances of the query for which the images are co-selected images. For example, the co-selection rate of 0.3 can indicate that the images I1 and I3 are co-selected images 30% of the time that a particular query (e.g., Q1) was received. The co-selection rate can also be a value that is normalized to another scale (e.g., 0-10), or based on other metrics such as the number of times that the images are co-selected relative to a number of times that the images are presented together on a search results page for the query.

The image similarity apparatus 120 obtains a co-selection vector (e.g., $CSV_{I1}$-$CSV_{In}$) for each of the images that were provided in response to the particular query (306). In some implementations, the co-selection vector for a particular image is a set of values that specify, on a per-image basis, the co-selection rate of the particular image with each of the other images. For example, a co-selection vector (e.g., $CSV_{I1}$) for image I1 can include the values of the row (or column) of the co-selection matrix 208 that includes the co-selection rates for image I1. Other data structures (e.g., a linked list or hash-table) can be used to store co-selection data for the image.

The image similarity apparatus 120 determines co-selection scores 212 (e.g., $CSS_{I1:I2}$-$CSS_{IN-1:IN}$) for pairs of the images that were provided in response to the particular query (308). In some implementations, the co-selection score for each pair of images indicates a distance (e.g., a cosine distance) between the co-selection vectors for the images in the pair.

The image similarity apparatus 120 can select, based in part on the co-selection scores 212 sets of learning images 216 with which a query-dependent image profile will be determined (310). In some implementations, each set of learning images (e.g., $T_1$-$T_x$) is a triplet image set (i.e., three images) that includes a reference image and two other images that are selected based on their respective co-selection scores (i.e., relative to the reference image). Selection of an example triplet will be described with reference to table 218, which presents characteristics of example images that are included in the example triplet.

Selection of the triplet can begin with selection of a reference image (e.g., Ii). The reference image can be any image with which a user interacted during a search session, and the selection process described below can be iteratively repeated until each image that is referenced by the search data 202 has been selected as the reference image. According to the table 218, the reference image I1 in this example is the image that was presented at a first position in the search results page, as indicated by the search rank of "1".

The image similarity apparatus 120 selects a second image (e.g., Ij) to create a pair of images in the triplet. In some implementations, the second image is an image having a search rank that is lower than the search rank of the reference image (e.g., a rank indicating that the likelihood with which a user will interact with the second image is less than the likelihood with which the user will interact with the reference image). For example, as illustrated by table 218, the search rank of the second image I2, is "3" indicating that the second image I2 is presented at a third highest presentation position on the search results page that is provided in response to the particular query.

The image similarity apparatus 120 can also select the second image such that the co-selection score of the pair of images that includes the reference image and the second image is greater than a pre-specified minimum co-selection score threshold. For example, if the co-selection score is based on a scale of 0.0-1.0 (where a co-selection score of 1.0 indicates that the co-selection vectors are exactly the same), the co-selection score for the pair of images that includes the reference image and the second image can be required to be higher than 0.6. According to table 218 the co-selection score between for the reference image and the second image is 0.7, such that the threshold of 0.6 is satisfied and the image I3 can be added to the triplet.

The image similarity apparatus 120 selects a third image (e.g., Ik) for the triplet. In some implementations, the third image is an image having a search rank that is higher than the search rank of the second image (and optionally higher than the search rank for the reference image). For example, as illustrated by table 218, the search rank of the third image I3, is "2" indicating that the third image I3 is presented at a second highest presentation position on the search results page. Selecting the third image to have a search rank that is higher than at least one other image in the triplet helps reduce the likelihood that the user did not stop viewing images in the search results page before reaching the presentation location at which the third image is presented.

The image similarity apparatus 120 can also select the third image such that the co-selection score of the pair of images that includes the reference image and the third image is less than a pre-specified maximum co-selection score threshold. For example, if the co-selection score is again based on a scale of 0.0-1.0, the co-selection score for the pair of images that includes the reference image and the third image can be required to be lower than 0.2. According to table 218 the co-selection score between for the reference image and the third image is 0.1, such that the threshold of 0.2 is satisfied and the image I2 can be added to the triplet.

The image similarity apparatus 120 can store triplet data 220 in the historical data store 114 (or another data store). The triplet data 220 includes data specifying which images are included in each set of learning images. The triplet data 220 can be accessed to determine the query-dependent image profile, as described in more detail below.

The image similarity apparatus 120 determines a query-dependent image profile 222 (e.g., $QDIP_1$) for the particular query based, at least in part, on the sets of learning images (312). In some implementations, the query-dependent image profile is a vector of values in which each value is indicative of a relative importance of an image feature values for evaluating image similarity in the context of the particular query (e.g., for images that are being provided in response to the particular query).

For example, assume that a day image of the Eiffel Tower and a night image of the Eiffel Tower are considered by users to be visually similar (e.g., based on the co-selection score for the two images exceeding the minimum co-selection score threshold) when provided in response to the search query "Paris Landmarks." Also assume that an image of the Arc de Triomphe is considered by users to not be visually similar to either of the images of the Eiffel Tower (e.g., based on the co-selection scores for the image of the Arc de Triomphe and each of the two images being less than the maximum co-selection score threshold). In this example, the locations of edges may be more important than the color of the images in evaluating image similarity. Thus, the query-dependent image profile for "Paris Landmarks" may have an "edges value" that is higher than a "color value" indicating that edge information (e.g., edge location) is more important for evaluating image similarity than the color of the image.

The query-dependent image profile can be determined, for example, using a machine learning system that iteratively analyzes visual distances of the images that are included in the triplets for a particular query. For example, by iteratively analyzing visual distances between images in the triplets, an image profile can be identified such that relationship (1) is satisfied.

$$d_t(x_i,x_j) = \sqrt{\Sigma_{m=1}^M w_y^m (x_i^m - x_j^m)^2} \quad (1)$$

where, $x_i^m$ is the image feature value of the image feature m for the reference image $x_i$;

$x_j^m$ is the image feature value of the image feature m for the reference image $x_j$;

M is a feature dimension in the set of image feature values;

$d_t(x_i,x_j)$ is the visual distance (e.g., similarity) between image $x_i$ and image $x_j$; and $w_t^m$ is the value of the image profile for the image feature m.

In some implementations, a max margin technique can be used to determine a query dependent image profile (e.g., a vector of image feature value weights). For example, the max margin function can minimize (e.g., reduce below a threshold value) the norm of the vector of values (i.e., $w_t$) that represent the image profile. Relationship (2) illustrates the optimization problem that results from the max margin technique.

$$\min \tfrac{1}{2} \|w_t\|^2 \quad (2)$$

such that:

$w_t^T(\Delta^{x_i,x_k} - \Delta^{x_i,x_j}) > 1$;

$\forall (i,j) \in X_C, \forall (k) \in X_{nc}$;

$w_t^m \geq 0 \forall \in \{1, \ldots, M\}$; and $\Delta^{x_i,x_k} = (x_i - x_k)^T (x_i - x_k)$, where, $X_c$ is the set of clicked images during each session; and $X_{nc}$ is the set of non-clicked images during each session.

The image similarity apparatus 120 provided data specifying the query-dependent image profile (314). For example, an image feature weight vector that represents the query-dependent image profile is stored in the historical data store 114 (or another data store). In some implementations, the data specifying the query-dependent image profile are provided to another data processing apparatus that determines on a per-query basis measures of image similarity between pairs of images.

In some implementations, a query-dependent image profile can be determined, in a manner similar to that described above, for a group of queries that includes two or more queries. The group of queries can be formed, for example, based on data indicating that the queries are considered similar by users. For example, if at least a threshold number (or portion) of users submit two queries A and B during a same search session, then the queries A and B can be considered to be sufficiently similar to be included in a same group of queries. Similarly, if at least threshold number (or portion) of users submit query C and then interact with a query suggestion (e.g., a spell-corrected query, a synonym of the received query, or another suggested query), then the received query and the query suggestion can be considered sufficiently similar to be included in a same group of queries. Further, if at least a threshold number of images are labeled with labels D and E, then search queries that match (e.g., are the same as or considered sufficiently similar to) the labels D and E can be included in a same group of search queries.

Figure 4:
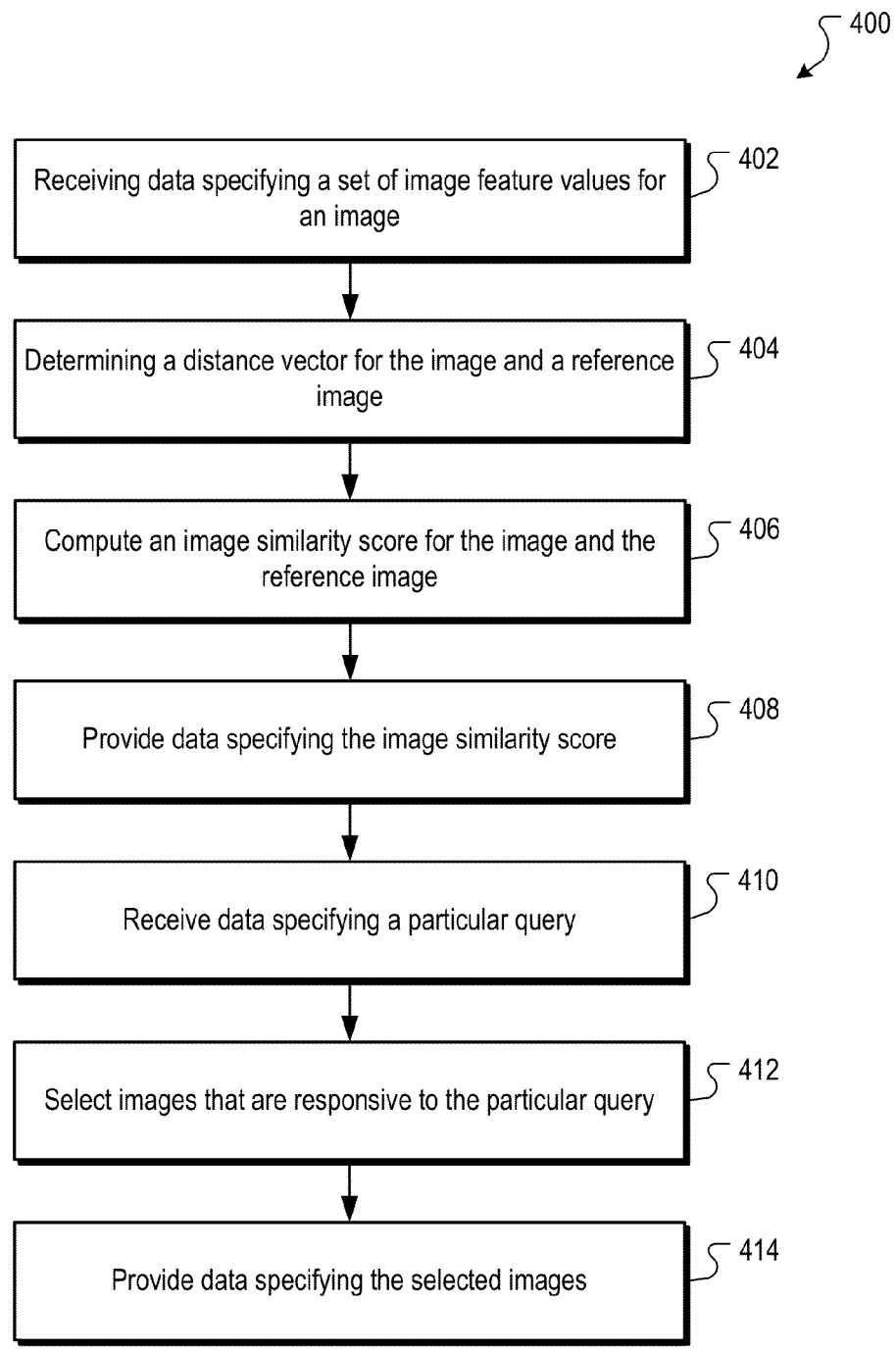
FIG. 4 is a flow chart of an example process for determining query-dependent image similarity scores.

FIG. 4 is a flow chart of an example process 400 for determining query-dependent image similarity scores. The process 400 is a process by which query-specific image similarity scores are computed for a pair of images based on the distances between images feature values for the images and the query-dependent image profile for the query. The image similarity score can then be stored in a data store and/or provided to a data processing apparatus.

Data specifying a set of image feature values for an image are received (402). In some implementations, the data can specify image feature values that are indicative of visual features of the image. For example, the image feature values can provide information about edge locations in the image, image color information, image texture, brightness information, and other visual features of the image. The set of image feature values can be obtained, for example, from a data store that stores the image feature values. For example, an image data store may store references to images, image feature values for each of the images, and/or image files that upon execution cause presentation of the images (or representations of the images).

A distance vector for the image and a reference image is determined (404). The reference image can be an image that has been previously identified as being responsive to a particular query. For example, the reference image can be an image that is presented at a highest presentation position of a search results page that is provided in response to the particular query. Alternatively (or additionally), the reference image can be an image having a highest user interaction rate (e.g., number of user interactions/number of presentations) when presented in response to the particular query. Further, the reference image can be any image that has been identified as responsive to the particular query.

In some implementations, the distance vector is a vector that is indicative of a visual distance between the image and the reference image. The distance vector can be determined based on a distance between one or more image feature values for each of the image and the reference image. For example, assume that the image and the reference image are each represented by a three term vector (e.g., image vector=L1, M1, N1 and reference image vector=L2, M2, N2), where each of the terms has a value indicative of a visual characteristic of the image. In this example, the distance vector can be a term-by-term difference between each of the image feature values in the vectors (e.g., distance vector=L1−L2, M1−M2, N1−N1).

A query-dependent image similarity score is computed for the image and the reference image (406). In some implementations, the query-dependent image similarity score represents a visual similarity of the image and the reference image when presented in response to the particular query. As illustrated in previous examples, two images of the Eiffel Tower may be considered visually similar for purposes of one query (e.g., "Paris Landmarks"), while not being considered visually similar for purposes of another query (e.g., "Eiffel Tower").

The query-dependent image similarity score can be computed, for example, based on the distance vector and the query-dependent image profile. For example, the query-dependent similarity score can be the result of a dot product of the distance vector and the query-dependent image profile for the particular query. The query-dependent image similarity score can also be computed according to relationship (1), where the $x_i$ can represent the reference image, $x_i$ can represent the other image in a pair of images, and $w_i$ can represent the query-dependent image profile (e.g., a vector of image feature value weights).

Data specifying the image similarity score is provided (408). In some implementations, the data can be stored in a data store from which other data processing apparatus (e.g., a search system) can access the data. The data can also be provided to another data processing apparatus for further processing. The data specifying the image similarity score can be associated with (e.g., indexed according to and/or stored with a reference to) each of the images for which the score was computed and/or the particular query.

Data indicating receipt of the particular query are received (410). In some implementations, the data can be received, for example, from a search system or a user device from which the particular query was submitted. The data can indicate the search query that was received and/or request images that are responsive to the search query. In some implementations, the data can indicate one or more images that have been identified as responsive to the particular query and/or request data specifying images that are considered visually similar to the responsive images (e.g., based at least in part on the query-dependent image profile for the particular query).

Images that are responsive to the particular query are selected (412). In some implementations, the images that are selected as responsive to the particular query include images that are considered visually similar to other images that have been identified (e.g., based on the labels) as being responsive to the particular query. For example, once a particular image has been identified as responsive to the particular query, other images that are considered visually similar to the particular images can also be considered responsive to the particular query.

For purposes of illustration, assume that Image T has a label that matches the particular query, and therefore has been identified as responsive to the particular query. Further assume that Image V does not have a label that matches the particular query, but that the query-dependent image similarity score for Image T and Image V is greater than a minimum image similarity score threshold (e.g., a value indicative of images that are considered visually similar for the particular query). In this example, Image V can be considered to be responsive to the particular query based on the image similarity score, irrespective of whether the Image V has a label that matches the particular query.

In some implementations, the images that are identified as responsive to the particular query based on the query-dependent image similarity scores can be limited to a particular number of images or a portion (e.g., 10%) of the images having a highest query-dependent image similarity score (e.g., relative to one of the images that was identified as responsive based on a label).

Data specifying the selected images are provided (414). In some implementations, the data that are provided can include image identifiers that specify which images were selected as responsive to the particular query and/or an image file that upon execution causes presentation of the image. The data that are provided can also include the query-dependent image similarity score for each of the selected images (and/or data identifying the reference image that was used to compute the query-dependent image similarity score). The data can be stored, for example, in a data store or provided to another data processing apparatus (e.g., a search system) that can further process the data.

Figure 5:
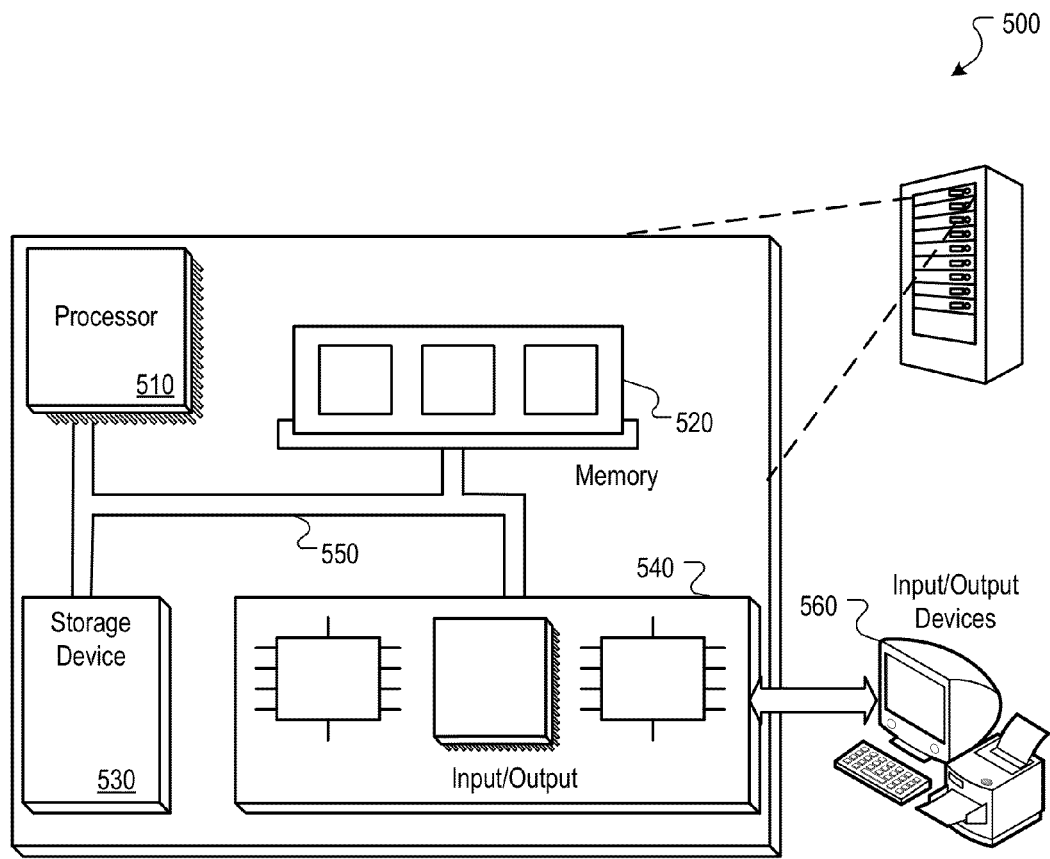
FIG. 5 is block diagram of an example computer system.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving, by a data processing apparatus, image search data for different search sessions, a search session being a pre-specified period, the image search data for a search session including:
       search query data specifying text search queries that were received during the search session;
       responsive image data specifying images that were identified in response to the text search queries; and
       interaction data specifying images referenced by search results with which a user interacted;
   identifying, based on the image search data, two or more images that were selected by a user during a search session as co-selected images for the search session;
   determining that a pair of images from the two or more images are co-selected images for a particular text query based on a co-selection rate for the pair of images meeting a co-selection threshold, wherein the co-selection rate is based on a number of times that different users interacted with the pair of images during a search session;
   determining, based in part on the co-selected images for the particular text query, a query-dependent image profile for the particular text query, the query-dependent image profile specifying an importance of one or more visual characteristics of images for identifying images responsive to the particular text query;
   receiving, from a user device, the particular text search query;
   identifying one or more images responsive to the particular text query based on visual characteristics of the one or more images and the query-dependent image profile for the particular text query; and
   providing, to the user device, data specifying the one or more images that were identified as responsive to the particular text query based on the query-dependent image profile.

2. The method of claim 1, further comprising:
receiving data specifying a set of feature values for each of one or more images;
for each of the images:
determining a distance vector for the image and a reference image, the distance vector being determined based on a visual distance between one or more image feature values from each of the image and the reference image, the reference image being an image that has been identified as responsive to the particular text query; and
computing a query-dependent image similarity score for the image and the reference image based on the visual distance and the query-dependent image profile; and
providing data specifying the query-dependent image similarity scores.

3. The method of claim 2, further comprising:
receiving data indicating that the particular text query was received from a user device;
selecting a set of images that are responsive to the particular text query, the set of images being selected, at least in part, on the query-dependent image similarity scores; and
providing data specifying the set of images.

4. The method of claim 1, wherein identifying two or more images comprises identifying two images that were both interacted with when referenced by a search results page for the particular text query.

5. The method of claim 1, further comprising:
obtaining a co-selection vector for each of the images that, according to the responsive image data, were identified in response to the particular text query;
determining a co-selection score for pairs of the images, the co-selection score for each pair of images indicating a distance between the co-selection vectors for the images in the pair; and
selecting, based on the co-selection scores and a search rank for each of the images, a plurality of sets of learning images for the query-dependent image profile, the search rank being a value indicative of a presentation location for the image on a search results page.

6. The method of claim 5, wherein selecting a plurality of sets of learning images comprises, for each set of learning images, selecting a pair of images for which the co-selection score is greater than a first distance threshold, wherein a first image in the pair has a search rank that is higher than the search rank for a second image in the pair.

7. The method of claim 6, wherein selecting a plurality of sets of learning images further comprises, selecting a third image for each set of learning images, wherein:
the co-selection score between the first image and the third image is below a second distance threshold;
the search rank of the third image is greater than the search rank of the second image, but lower than the first image; and
the first distance threshold is greater than the second distance threshold.

8. The method of claim 1, wherein determining a query-dependent image profile comprises determining an image feature weight vector for which a norm of the image feature weight vector is less than a threshold value.

9. The method of claim 1, wherein selecting a plurality of sets of learning images further comprises, selecting a third image for each set of learning images, wherein the co-selection score between the first image and the third image meets a second distance threshold.

10. The method of claim 9, wherein the search rank of the third image is greater than the search rank of the second image, but lower than the first image.

11. The method of claim 9, wherein the first distance threshold is greater than the second distance threshold.

12. The method of claim 1, further comprising:
determining, based in part on the co-selected images that were identified in response to a particular text query, a query-dependent image profile for the particular text query, the query-dependent image profile specifying, for one or more image feature values, an importance of the image feature value for determining a measure of image similarity for images, an image feature value being indicative of a visual characteristic of the image; and
providing data specifying the query-dependent image profile.

13. A non-transitory computer storage medium encoded with a computer program, the program comprising instructions that when executed by data processing apparatus cause the data processing apparatus to perform operations comprising:
receiving, by a data processing apparatus, image search data for different search sessions, a search session being a pre-specified period, the image search data for a search session including:
search query data specifying text search queries that were received during the search session;
responsive image data specifying images that were identified in response to the text search queries; and
interaction data specifying images referenced by search results with which a user interacted;
identifying, based on the image search data, two or more images that were selected by a user during a search session as co-selected images for the search session;
determining that a pair of images from the two or more images are co-selected images for a particular text query based on a co-selection rate for the pair of images meeting a co-selection threshold, wherein the co-selection rate is based on a number of times that different users interacted with the pair of images during a search session;
determining, based in part on the co-selected images for the particular text query, a query-dependent image profile for the particular text query, the query-dependent image profile specifying an importance of one or more visual characteristics of images for identifying images responsive to the particular text query; and
receiving, from a user device, the particular text search query;
identifying one or more images responsive to the particular text query based on visual characteristics of the one or more images and the query-dependent image profile for the particular text query; and
providing, to the user device, data specifying the one or more images that were identified as responsive to the particular text query based on the query-dependent image profile.

14. The computer storage medium of claim 13, wherein the program further comprises instructions that when executed by data processing apparatus cause the data processing apparatus to perform operations comprising:
receiving data specifying a set of feature values for each of one or more images;
for each of the images:
determining a distance vector for the image and a reference image, the distance vector being determined based on a visual distance between one or more image feature values from each of the image and the reference image, the reference image being an image that has been identified as responsive to the particular text query; and computing a query-dependent image similarity score for the image and the reference image based on the visual distance and the query-dependent image profile; and providing data specifying the query-dependent image similarity scores.

15. The computer storage medium of claim 14, wherein the program further comprises instructions that when executed by data processing apparatus cause the data processing apparatus to perform operations comprising:

receiving data indicating that the particular text query was received from a user device;

selecting a set of images that are responsive to the particular text query, the set of images being selected, at least in part, on the query-dependent image similarity scores; and providing data specifying the set of images.

16. The computer storage medium of claim 13, wherein identifying two or more images comprises identifying two images that were both interacted with when referenced by a search results page for the particular text query.

17. The computer storage medium of claim 13, wherein the program further comprises instructions that when executed by data processing apparatus cause the data processing apparatus to perform operations comprising:

obtaining a co-selection vector for each of the images that, according to the responsive image data, were identified in response to the particular text query;

determining a co-selection score for pairs of the images, the co-selection score for each pair of images indicating a distance between the co-selection vectors for the images in the pair; and selecting, based on the co-selection scores and a search rank for each of the images, a plurality of sets of learning images for the query-dependent image profile, the search rank being a value indicative of a presentation location for the image on a search results page.

18. The computer storage medium of claim 17, wherein selecting a plurality of sets of learning images comprises, for each set of learning images, selecting a pair of images for which the co-selection score is greater than a first distance threshold, wherein a first image in the pair has a search rank that is higher than the search rank for a second image in the pair.

19. The computer storage medium of claim 18, wherein selecting a plurality of sets of learning images further comprises, selecting a third image for each set of learning images, wherein:

the co-selection score between the first image and the third image is below a second distance threshold;

the search rank of the third image is greater than the search rank of the second image, but lower than the first image; and the first distance threshold is greater than the second distance threshold.

20. The computer storage medium of claim 13, wherein determining a query-dependent image profile comprises determining an image feature weight vector for which a norm of the image feature weight vector is less than a threshold value.

21. The computer storage medium of claim 13, wherein selecting a plurality of sets of learning images further comprises, selecting a third image for each set of learning images, wherein the co-selection score between the first image and the third image meets a second distance threshold.

22. The computer storage medium of claim 21, wherein the search rank of the third image is greater than the search rank of the second image, but lower than the first image.

23. The computer storage medium of claim 21, wherein the first distance threshold is greater than the second distance threshold.

24. The computer storage medium of claim 23, wherein the program further comprises instructions that when executed by data processing apparatus cause the data processing apparatus to perform operations comprising:

determining, based in part on the sets of learning images that include co-selected images that were identified in response to a particular text query, a query-dependent image profile for the particular text query, the query-dependent image profile specifying, for one or more image feature values, an importance of the image feature value for determining a measure of image similarity for images, an image feature value being indicative of a visual characteristic of the image; and providing data specifying the query-dependent image profile.

25. A system comprising:

a data store storing image search data for different search sessions, a search session being a pre-specified period, the image search data for a search session including:

search query data specifying text search queries that were received during the search session;

responsive image data specifying images that were identified in response to the text search queries; and interaction data specifying images referenced by search results with which a user interacted; and one or more computers that are configured to interact with the data store, the one or more computers being further configured to perform operations comprising:

receiving, from the data store, the image search data;

identifying, based on the image search data, two or more images that were selected by a user during a search session as co-selected images for the search session;

determining that a pair of images from the two or more images are co-selected images for a particular text query based on a co-selection rate for the pair of images meeting a co-selection threshold, wherein the co-selection rate is based on a number of times that different users interacted with the pair of images during a search session;

determining, based in part on the co-selected images for the particular text query, a query-dependent image profile for the particular text query, the query-dependent image profile specifying an importance of one or more visual characteristics of images for identifying images responsive to the particular text query; and receiving, from a user device, the particular text search query;

identifying one or more images responsive to the particular text query based on visual characteristics of the one or more images and the query-dependent image profile for the particular text query; and providing, to the user device, data specifying the one or more images that were identified as responsive to the particular text query based on the query-dependent image profile.

26. The system of claim 25, wherein the one or more computers are further configured to perform operations comprising:

receiving data specifying a set of feature values for each of one or more images;

for each of the images:
  determining a distance vector for the image and a reference image, the distance vector being determined based on a visual distance between one or more image feature values from each of the image and the reference image, the reference image being an image that has been identified as responsive to the particular text query; and
  computing a query-dependent image similarity score for the image and the reference image based on the visual distance and the query-dependent image profile; and
providing data specifying the query-dependent image similarity scores.

27. The system of claim 26, wherein the one or more computers are further configured to perform operations comprising:
  receiving data indicating that the particular text query was received from a user device;
  selecting a set of images that are responsive to the particular text query, the set of images being selected, at least in part, on the query-dependent image similarity scores; and
  providing data specifying the set of images.

28. The system of claim 25, wherein identifying two or more images comprises identifying two images that were both interacted with when referenced by a search results page for the particular text query.

29. The system of claim 25, wherein the one or more computers are further configured to perform operations comprising:
  obtaining a co-selection vector for each of the images that, according to the responsive image data, were identified in response to the particular text query;
  determining a co-selection score for pairs of the images, the co-selection score for each pair of images indicating a distance between the co-selection vectors for the images in the pair; and
  selecting, based on the co-selection scores and a search rank for each of the images, a plurality of sets of learning images for the query-dependent image profile, the search rank being a value indicative of a presentation location for the image on a search results page.

30. The system of claim 29, wherein selecting a plurality of sets of learning images comprises, for each set of learning images, selecting a pair of images for which the co-selection score is greater than a first distance threshold, wherein a first image in the pair has a search rank that is higher than the search rank for a second image in the pair.

31. The system of claim 30, wherein selecting a plurality of sets of learning images further comprises, selecting a third image for each set of learning images, and wherein:
  the co-selection score between the first image and the third image is below a second distance threshold;
  the search rank of the third image is greater than the search rank of the second image, but lower than the first image; and
  the first distance threshold is greater than the second distance threshold.

32. The system of claim 25, wherein determining a query-dependent image profile comprises determining an image feature weight vector for which a norm of the image feature weight vector is less than a threshold value.

33. A system comprising:
  a data store storing image search data for different search sessions, a search session being a pre-specified period, the image search data for a search session including:
    search query data specifying text search queries that were received during the search session;
    responsive image data specifying images that were identified in response to the text search queries; and
    interaction data specifying images referenced by search results with which a user interacted; and
  one or more computers that are configured to interact with the data store, the one or more computers being further configured to perform operations comprising:
    receiving, from the data store, the image search data;
    determining a co-selection score for pairs of the images that were selected by a user during a search session as co-selected images for the search session, the co-selection score for a pair of images indicating a distance between co-selection vectors for the images in the pair, and wherein the co-selection score is based on a number of times that users interacted with the pair of images during a search session;
    selecting, based on the co-selection scores and a search rank for each of the images, a plurality of sets of learning images, the search rank being a value indicative of a presentation location for the image on a search results page; and
    receiving, from a user device, the particular text search query;
    identifying one or more images responsive to the particular text query based on visual characteristics of the one or more images and the query-dependent image profile for the particular text query; and
    providing, to the user device, data specifying the one or more images that were identified as responsive to the particular text query based on the query-dependent image profile.

34. The system of claim 33, wherein selecting a plurality of sets of learning images comprises, for each set of learning images, selecting a pair of images for which the co-selection score meets a first distance threshold, wherein a first image in the pair has a search rank that is higher than the search rank for a second image in the pair.

35. The system of claim 34, wherein selecting a plurality of sets of learning images further comprises, selecting a third image for each set of learning images, wherein the co-selection score between the first image and the third image meets a second distance threshold.

36. The system of claim 35, wherein the search rank of the third image is greater than the search rank of the second image, but lower than the first image.

37. The system of claim 35, wherein the first distance threshold is greater than the second distance threshold.

38. The system of claim 37, wherein the one or more computers are further configured to perform operations comprising:
  determining, based in part on the sets of learning images that include co-selected images that were identified in response to a particular text query, a query-dependent image profile for the particular text query, the query-dependent image profile specifying, for one or more image feature values, an importance of the image feature value for determining a measure of image similarity for images, an image feature value being indicative of a visual characteristic of the image; and
  providing data specifying the query-dependent image profile.

39. The system of claim 33, wherein determining a query-dependent image profile comprises determining an image feature weight vector for which a norm of the image feature weight vector is less than a threshold value.

* * * * *